United States Patent [19]

Wierwille

[11] 4,384,732

[45] May 24, 1983

[54] WALKING AID

[76] Inventor: Walter W. Wierwille, 18 Laurel Dr., Blacksburg, Va. 24060

[21] Appl. No.: 250,959

[22] Filed: Apr. 1, 1981

[51] Int. Cl.[3] .................................................. B62B 11/00
[52] U.S. Cl. ........................... 280/289 WC; 188/2 F; 188/74; 280/242 WC; 280/755
[58] Field of Search ............... 280/242 WC, 289 WC, 280/755, 759; 188/2 F, 20, 74

[56] References Cited

U.S. PATENT DOCUMENTS

| | | | |
|---|---|---|---|
| 1,307,058 | 6/1919 | McGrath | 135/67 |
| 1,448,783 | 3/1923 | Blewitt | 135/67 X |
| 1,933,421 | 10/1933 | Elliotte | 188/20 X |
| 2,872,967 | 2/1959 | Kirkpatrick | 280/651 X |
| 2,877,915 | 3/1959 | Puim | 280/759 X |
| 3,165,314 | 1/1965 | Clearman et al. | 280/47.34 X |
| 3,504,933 | 4/1970 | Avis et al. | 280/759 |
| 3,529,700 | 9/1970 | Marshall | 188/2 F X |
| 3,708,182 | 1/1973 | Markiel | 280/289 WC |
| 4,116,464 | 9/1978 | Haley | 280/33.99 C X |
| 4,271,933 | 6/1981 | Pearce et al. | 188/2 F |
| 4,322,093 | 3/1982 | Otto | 280/289 WC X |

*Primary Examiner*—David M. Mitchell
*Assistant Examiner*—Michael Mar
*Attorney, Agent, or Firm*—Henderson & Sturm

[57] ABSTRACT

This invention relates to walking aids in general, and more specifically to a wheelchair structure, which is adapted to be used in the normal manner, but which is modified in such a way that it will serve the dual function of walking aid, by incorporation into the standard wheelchair design, of a braking mechanism mounted on a support surface of the wheelchair, which is normally gripped by someone other than the occupant of the chair, and further by the provision of a weighted element which changes the normal center of gravity of the wheel chair to improve its stability in the walking aid mode.

3 Claims, 6 Drawing Figures

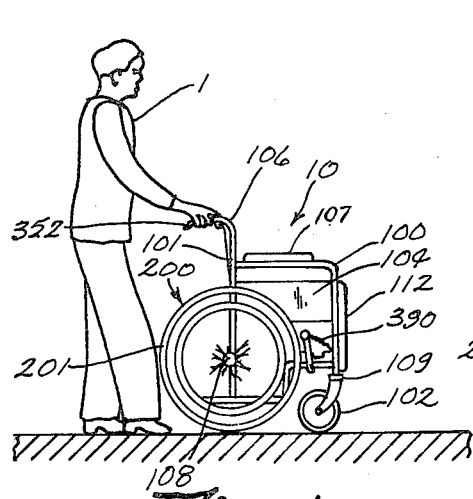
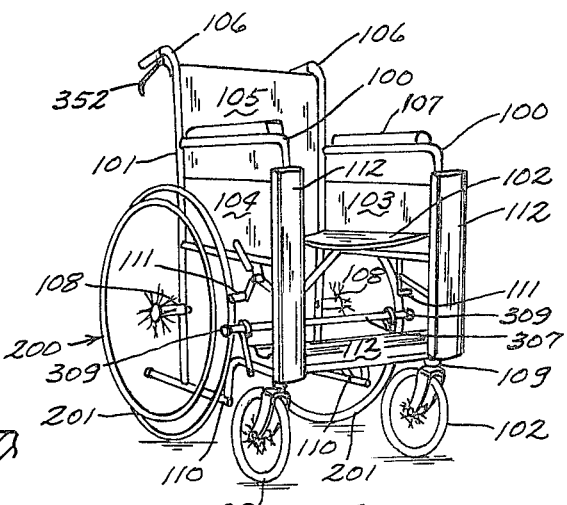
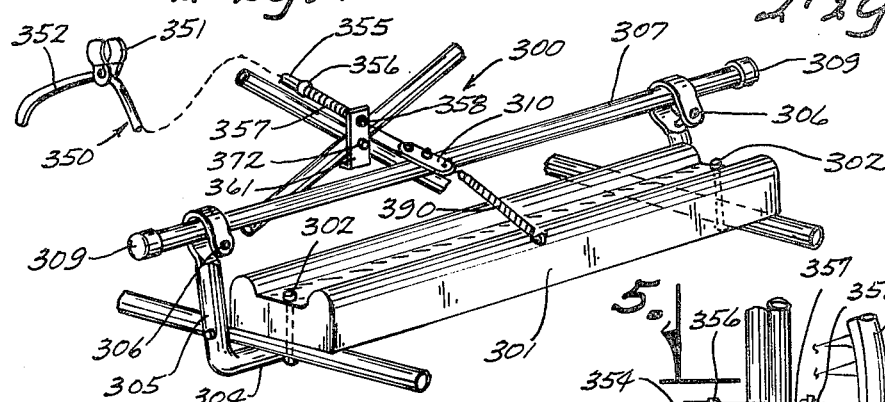
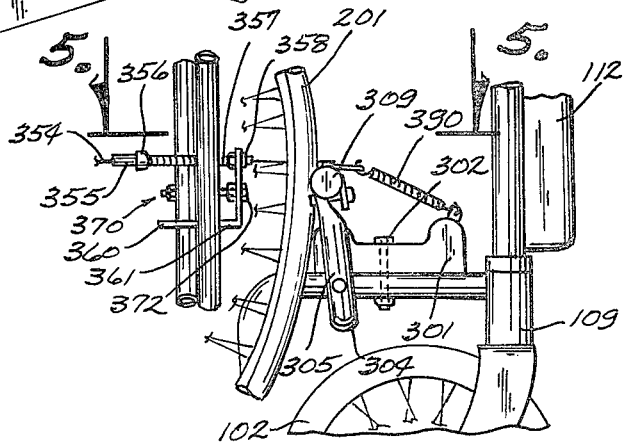
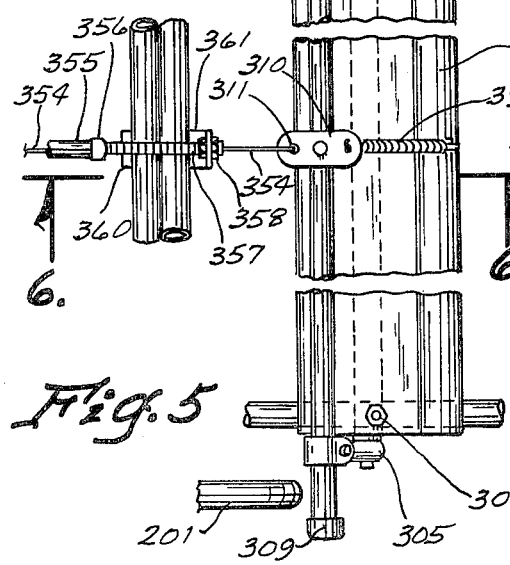

WALKING AID

BACKGROUND OF THE INVENTION

It is a well recognized fact that many elderly or impaired people require a walking aid for rehabilitation or locomotion purposes. The standard "walker" is a device having four legs, which are lifted and advanced by the user, with the user advancing one or more steps prior to the cycle being repeated.

Some of the deficiencies inherent in the standard "walker" are the fact that the lift-move-set-step operation places an unnatural strain on the users legs, back and arms, and in particular produces a bending movement on the spinal column. The speed of the "walker" is also a problem in that the pace permissible with such a device is usually one-fourth to one-third the normal walking pace. In addition most walkers are notoriously unstable and cannot be used by persons subject to vertigo or having deteriorated joints. During the operation of the walker, it must be lifted and set down a number of times, which requires excellent balance and coordination, since any unusual forces applied to the walker will cause it to tip over thereby toppling the user. Furthermore, the standard walker is not particularly rehabilitative, since it does not encourage normal walking due to the slow speeds and unusual manipulations, which the user is forced to endure while operating the device.

Because of the disadvantages of a standard walker listed supra, an attempt was made to develop an improved device. It was obvious that such an improved device should incorporate the following list of desirable performance features and properties:

It should have a low center of mass and a high resistance to tipping in any direction.

It should have sufficient stability so that it can be relied on 100 percent of the time during walking. Hand grips would provide a smooth, perdictable trajectory, and these grips would be relied upon in case the user trips, stumbles, or loses balance.

The mass of the device would be small enough to make stopping easy, and a braking system would be incorporated as a stopping aid.

It should allow the user to attain normal walking speeds, or any speed less than normal walking speed at which the user is comfortable.

No lifting forces of any kind should be required.

The device should have minimum protrusions around the user so that it is maneuverable, and the periphery of the device would be padded so that the effect of a collision would be minimized.

Finally, the device should encourage and promote rehabilitation.

Examples of prior art devices which unsuccessfully attempted to meet the above stated criteria can be seen by reference to the following U.S. Pat. Nos. 4,116,464; 3,165,314; 2,872,967; 1,448,783 and 1,307,058.

The present invention is based around the idea of modifying a standard wheelchair in such a manner that the wheelchair in effect becomes a walking device.

To this end a wheelchair was purchased, analyzed, and then modified. The modifications were such that the flexing chassis of the wheelchair, which allows it to maintain all four wheels on uneven floors, was not comprised. The modifications comprised: the addition of mass at the base toward the front wheels, to lower the overall center of mass and reduce the possibility of tipping; the addition of an "equal-force" braking system to aid the user in stopping the system, with a straight trajectory; the removal of the footrests to reduce protrusions on the forward end of the wheelchair; and the addition of padding at the front of the wheelchair to reduce the probability and consequences of a collision.

With these modifications, the wheelchair possessed the desirable properties that the improved walker should have.

In addition there were several unforeseen benefits to the user that result from using the modified wheelchair as a walker since the seating capability and the normal function of the wheelchair are not lost, the user may use the seat; to transport items; to rest between walking sessions; to move the chair from a seated position between walking sessions; to sit in the chair at a destination; or to give aid to another person by having that person ride the chair while it is being pushed. Because wheelchairs are familiar to most of the population, learning time and acceptance problems should be minimized.

The steering and handling capabilities of wheelchairs are well-developed and predictable. Also, the large rear wheels tend to reduce problems associated with floor or pavement irregularities. Advantage could also be taken of the existing mass-production capability for wheelchairs, to minimize cost to each user. Finally since current building codes now require ramp entrances and elevators in public buildings, these codes favor the use of a wheelchair as a walker.

Some of the potential applications of the instant invention are: as a relatively permanent walking aid for the elderly, replacing the poorly designed standard walker; as a temporary or permanent walking aid for persons with dizziness and other equilibrium problems; as a rehabilitation and therapy device for many types of leg and hip injuries, including muscle and joint problems as well as fractures, strains and sprains; and a rehabilitation device for a variety of post-operative conditions in which the patient must get up and walk as soon as possible, to avoid complications.

SUMMARY OF THE INVENTION

An object of the instant invention is the conversion of a standard piece of hospital equipment having a singular utility into a dual purpose device.

Another object of the instant invention is the provision of a device, which will perform in two modes, thereby eliminating the need for two separate pieces of equipment and subsequently reducing hospital equipment expenses.

Yet another object of the instant invention is the provision of a conversion kit, which will be adapted to fit on all types of wheelchair, so that they may be utilized as walking aids.

Still another object of the instant invention is the provision of a device which enhances the structural stability of the wheelchair to facilitate its operation as a walking aid.

A further object of the instant invention is the provision of a walking aid, which the user will have become accustomed to, familiar with, and gained confidence in, by initially using the device in the wheelchair mode.

A still further object of the present invention is to provide means which can be quickly, easily and inexpensively installed on a wheelchair to convert it into a walking aid, but will in no way interfere with its operation as a wheelchair.

These and other objects, advantages and novel features of the invention will become apparent when considered in light of the detailed description to follow, particularly when viewed in conjunction with the accompanying drawings.

BRIEF DESCRIPTION OF THE DRAWINGS

FIG. 1 is a side view of a patient using the modified wheelchair as a walking aid.

FIG. 2 is a perspective view of the modified wheelchair showing in greater detail how the modifying structure is disposed on a standard wheelchair.

FIG. 3 is a detailed view of the brake actuator and brake support mechanism, showing how they cooperate, and how the support mechanism is mounted on the wheelchair frame.

FIG. 4 is a detailed view of the brake cable and braking mechanism as they would appear when the brake engages the rear wheels.

FIG. 5 is a cross-sectional view taken through line 5—5 of FIG. 4, and illustrates the disposition of the respective elements prior to the brake being engaged.

FIG. 6 is a cross-sectional view taken through line 6—6 of FIG. 5, which illustrates the cable support mechanism, and how the cable actuator cooperates with the brake mechanism.

DETAILED DESCRIPTION OF THE PREFERRED EMBODIMENT

In FIG. 1, a patient designated as 1 can be seen utilizing the modified wheelchair of the instant invention in the walking aid mode. The wheelchair is designated generally as 10 and comprises a tubular frame element 100 which is provided with a wheel assembly 200.

As can best be seen by reference to FIG. 2, the tubular frame element 100 is of standard design and comprises a main frame assembly 101 which is provided with a seat element 102, side panels 103, 104 and back support 105, which would surround and support a patient sitting in the wheelchair during its operation in that mode.

The upper portion of the frame assembly 101 is provided with a pair of rearwardly extending handle elements 106, and a pair of padded arm rests 107. The lower portion of the frame assembly is provided with rear wheel axle assemblies 108 and front wheel axle assemblies 109 which are operatively connected to one another via the base portion 110 of the frame assembly 101.

The large rear wheels 201 and the smaller front wheels 202 are connected to their respective axle assemblies in a well known manner. Each of the rear wheels 201 are further provided with independently actuated brake elements 111, which are operatively connected to, and disposed on, the frame assembly 101, in such a manner that they are readily accessable to a patient sitting in the wheelchair.

The description so far, could be describing any wheelchair currently being employed in any health care facility in the world, and therein lies the appeal of the invention which is about to be disclosed. A discerning observer will have already noticed that the collapsible footrests, which are normally found on a wheelchair, are conspicuously absent from the wheelchair illustrated in FIG. 2, and furthermore obvious modifications have been made to the front of the wheelchair 10.

First of all the footrests have been removed, not only for ease of illustrating the preferred embodiment, but also due to the fact that they protrude beyond the front of the frame assembly 101, and would defeat the purpose of the modifications which form the basis of the invention. The wheelchair sans footrests is provided on its forwardmost surfaces, with padded members 112 which project substantially beyond the frame assembly 101, and act to cushion any impact transmitted to the front of the wheelchair by contact with an obstacle as it is being pushed from behind.

While the padded members 112 serve a very important function and purpose, they are ancillary to the conversion equipment, designated generally as 300 in FIG. 3, which forms the heart of this invention, and which allows the wheelchair to serve in a dual role as a walking aid or "walker."

As can best be seen in FIGS. 2 thru 5, a weighted mass element 301 is disposed on the base portion 110 of the frame assembly 101 intermediate the forward and rearward wheels and extending across the width of frame assembly. Placing this weighted mass below the normal center of gravity of the wheelchair, and towards the front wheels, equally distributes the added weight and greatly enhances the stability of the device.

For a wheelchair having the same general configuration as that illustrated in FIGS. 1 and 2, and weighing 35 lbs. The rearward tipping force was calculated to be 56 lbs. When a weighted mass 301 equal to 27 lbs. was disposed on the wheelchair, at the approximate location indicated, the rearward tipping force was recalculated and found to be 131.6 lbs. or the resistance to tipping was increased by a factor of 2.35. Likewise the lateral tipping forces were found to be 24.3 lbs. without the weighted mass, and 57.1 lbs. with the mass, thus increasing the resistance to tipping of the wheelchair in the lateral plane by a factor of 1.77.

Referring now to FIGS. 3 through 6, it can be seen that the weighted mass 301, besides vastly improving the stability of the overall device, forms an integral part of the modifying structure. The weighted mass 301, rests on, extends across, and is secured to, both sides of the base portion 110 of the framework via suitable securing means 302 which extend through both the weighted mass and the tubular framework. The securing bolts 302 are not drawn up tight against the frame 110. They are instead set to eliminate any lifting of the mass 301 off the frame 110, thereby preserving the frame flexing characteristics of the usual wheelchair chassis. A generally elongated U-shaped support bracket 301 is pivotally attached to the base portion framework adjacent to the weighted mass 301. The base portion 304, of the support bracket is suspended beneath the weighted mass and extends beyond the sides of the framework 101. The arms 305 of the support bracket extend above the weighted mass and terminate in curved flattened end portions 302 which receive the brake member 307.

The brake member 307 comprises an elongated element in the form of a bar 308, which extends beyond both of the rear wheels, and which is provided with resilient cap members 309 at its respective ends. An apertured brake bracket member 301 is secured to the upper surface of the bracket member 307, and operatively connects the brake actuating mechanism 350 with the weighted mass 301.

The brake actuating mechanism 350 comprises a cable and lever arrangement similar to the type of hand brake actuator commonly found on bicycles. The brake actuating mechanism 350 is secured to at least one of the wheelchair handles 106 via suitable clamping means 351. The lever 352 is pivotally connected to the clamping means 351, and operatively connected to the cable 353 in a well known manner. The cable 353 extends from the lever 352 to the rearward position of the apertured bracket member 310, and is supported intermediate these points by a cable support bracket 360. The cable support bracket 360, is mounted on the wheelchair frame cross members 115, and comprise an L-shaped member 361, whose horizontal leg extends between the frame cross-members, and whose vertical leg has a plurality of apertures disposed at, and above, the juncture of the cross-members. The cable support bracket 360 is mounted for relative horizontal displacement with respect to the cross-members 115, via an adjustable securing mechanism 370. The securing mechanism 370 comprises a threaded bolt 371, which is received within a suitable aperture drilled through the cross-members at their juncture, and a plurality of locking nuts 372 which are used to secure the cable support bracket to the framework and the threaded bolt. By varying the position of the rearwardly disposed locking nut 372, the horizontal disposition of the cable support bracket with respect to the cross members may be varied.

The cable element 353, which comprises a wire cable member 354, disposed within a cable sheath 355, terminates in a sheath cap 356, which is rigidly secured to a hollow threaded bolt 357. Threaded bolt 357 is dimensioned to be received within the upper aperture of the cable support bracket and secured thereto by a pair of standard nuts 358. A portion of the cable 354 extends through the hollow bolt 357 and operatively connects the cable 353 with the apertured brake bracket member 310 via a suitable securing means 311 disposed in one of the apertures. A spring biasing element 390 is attached, on one end to another aperture in the brake bracket member 310, and on the other end to the weighted mass 301, thereby completing and makeing operational the connection between the brake member 307 and the brake actuating mechanism 350.

The operation of the modified device 10 as a walking aid will now be described in detail. The patient as shown in FIG. 1, stands behind the wheelchair grasping the handles 106 and the brake actuating mechanism 350. When the lever 352 is engaged the brake member will assume the position illustrated in FIG. 4, bringing the brake member into uniform engagement with the rear wheels. When the lever 352 is disengaged the brake member will assume the position illustrated in FIGS. 5 and 6, disengaging the brake member from the rear wheels, and allowing rolling motion of the wheelchair/-walker.

Engagement of the lever 352 pulls the cable 354 in the direction of the rear wheels, and since the cable is attached to the brake member 307 via the brake bracket member, the force will overcome the spring biasing element 390. When the lever 352 is disengaged, the spring biasing element has to overcome the frictional forces between the wire cable member 354 and the cable sheath, to release the brake member from engagement with the rear wheels.

It is a simple matter to adjust the force necessary to engage the brake member to suit the degree of infirmity present in a patient utilizing the device as a walking aid. All that is required to vary the force necessary to accomplish brake actuation, is simply to vary the horizontal displacement of the cable support bracket with respect to the cross-members via the adjustable securing mechanism 370 as outlined supra.

Since the same amount of force is applied to the rear wheels, by the single brake member engaging each rear wheel simultaneously, by virtue of the centrally disposed brake bracket on the brake member, the tendency of the device to yaw or turn when an uneven brake force is applied to the respective wheels will be virtually eliminated.

It should be appreciated by now, that the incorporation of the above described modifying structure into a standard wheelchair will result in a very stable device which can be used either in the wheelchair mode or the walking aid mode or in both modes simultaneously if one patient is sitting in the wheelchair and another is walking behind the wheelchair. Furthermore, the disclosed device satisfies all of the criteria, parameters and objectives which were set forth above and which no other device to date has even come close to satisfying.

Having thereby disclosed the subject matter of this invention, it should be obvious that many modifications, substitutions and variations of the invention are possble in light of the above teachings. It is therefore to be understood, that the invention may be practised other than as specifically described and should be limited only by the breadth and scope of the appended claims.

What I claim is:

1. An improved wheelchair having a frame disposed on front and rear wheel assemblies, a pair of handles extending rearwardly from the frame, a seat, side panels and a back portion disposed on the frame to support a patient, and a first manually actuated rear wheel brake mechanism disposed on the frame in such a location that it is easily accessible to a patient sitting in the wheelchair; wherein, the improvement comprises the addition to the aforementioned structure of the following;

a moveable mass disposed on, and extending across the width of the frame, and attached thereto intermediate the front and rear wheel assemblies, wherein, the weighted mass is disposed on the frame at a position forward and below, both the axle of the rear wheel assembly, and the normal center of gravity of said wheelchair, and is loosely supported on the frame in such a manner, that it does not inhibit the inherent flexibility of the wheelchair;

a second brake member connected and pivotally disposed with respect to said weighted mass, and adapted to apply uniform braking forces across said rear wheel assembly; and a second brake member actuation mechanism operatively connected to both said weighted mass and said second brake member, and disposed on at least one of said rearwardly extending handles; wherein, said second brake member is secured to a U-shaped support bracket, which is pivotally disposed with respect to said weighted mass; and said second brake member further comprises an elongated brake element, which extends across the width of said frame, and beyond said rear wheel assembly.

2. An improved wheelchair as in claim 1; wherein, the operative connection between the second brake member and the weighted mass is in the form of a spring, which normally biases the second brake member away from the engagement with the rear wheel assembly.

3. An improved wheelchair as in claim 2; wherein, said second brake actuation mechanism further comprises a lever and flexible cable arrangement, operatively connected to the mid-point of said elongated brake element, so that the actuating forces transmitted to said element are equally distributed to said rear wheel assembly.

* * * * *